United States Patent
Sugiura et al.

(10) Patent No.: US 9,914,261 B2
(45) Date of Patent: Mar. 13, 2018

(54) TRANSFER DEVICE, MOLDED MATERIAL AND TRANSFER METHOD

(71) Applicant: Toshiba Kikai Kabushiki Kaisha, Tokyo (JP)

(72) Inventors: Yuki Sugiura, Mishima (JP); Mitsunori Kokubo, Numazi (JP); Shigeru Fujiwara, Numazu (JP); Hidetoshi Kitahara, Atami (JP); Yu Murofushi, Numazu (JP); Isao Matsuzuki, Numazu (JP); Takato Baba, Mishima (JP); Toru Suzuki, Fuji (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 511 days.

(21) Appl. No.: 14/015,777

(22) Filed: Aug. 30, 2013

(65) Prior Publication Data

US 2014/0072768 A1    Mar. 13, 2014

(30) Foreign Application Priority Data

Aug. 31, 2012   (JP) ................................. 2012-191781

(51) Int. Cl.
*B29C 59/04*        (2006.01)

(52) U.S. Cl.
CPC ............ *B29C 59/043* (2013.01); *B29C 59/04* (2013.01); *B29C 59/046* (2013.01); *Y10T 428/24479* (2015.01)

(58) Field of Classification Search
CPC ..... B29C 59/04; B29C 59/043; B29C 59/046; Y10T 428/24479

USPC .................................................. 425/385, 177

See application file for complete search history.

(56) References Cited

U.S. PATENT DOCUMENTS

| | | | |
|---|---|---|---|
| 7,404,919 B2 * | 7/2008 | Yokoyama | .......... B29C 33/3857 |
| | | | 156/275.5 |
| 2005/0253290 A1 | 11/2005 | Yokoyama et al. | |
| 2012/0313289 A1 | 12/2012 | Itani et al. | |
| 2013/0323347 A1 | 12/2013 | Itani et al. | |

FOREIGN PATENT DOCUMENTS

| | | |
|---|---|---|
| DE | 603 17 792 T2 | 10/2008 |
| DE | 11 2011 103 391 T5 | 7/2013 |
| JP | 2007-165812 | 6/2007 |
| JP | 2009-214323 | 9/2009 |
| JP | 2010-000719 | 1/2010 |
| JP | 2010-080680 | 4/2010 |

(Continued)

OTHER PUBLICATIONS

German Office Action dated in 10 2013 217 329.6 dated Jul. 11, 2014.

(Continued)

*Primary Examiner* — Seyed Masoud Malekzadeh

(74) *Attorney, Agent, or Firm* — DLA Piper LLP (US)

(57) ABSTRACT

A transfer device that transfers a fine transfer pattern formed on a master mold to a molded material, includes a first transfer unit that transfers the fine transfer pattern formed on the master mold to a replica mold made from a material that transmits light; and a second transfer unit that transfers a fine transfer pattern formed on the replica mold by the first transfer unit to the molded material.

6 Claims, 11 Drawing Sheets

(56) References Cited

FOREIGN PATENT DOCUMENTS

| JP | 2010-525968 | 7/2010 |
|----|-------------|--------|
| JP | 2011-178052 | 9/2011 |

OTHER PUBLICATIONS

English Language Translation for German Office Action issued in 10 2013 217 329.6 dated Jul. 11, 2014.
Korean Patent Office Action issued in 10-2013-102369 dated Oct. 6, 2014.
English Language Translation for Korean Patent Office Action issued in 10-2013-102369 dated Oct. 6, 2014.
English Language Abstract and Translation of JP 2011-178052 published Sep. 15, 2011.
B.J. Choi, et al "Design of orientation stages for step and flash imprint lithography", Precision Engineering and Nanotechnology 25(2001), pp. 192-199.
Taiwanese Office Action issued in TW 10421645190 dated Dec. 1, 2015.
English Language Abstract and Translation for JP 2010-000719 published Jan. 7, 2010.
Japanese Office Action issued in JP 2012-191781 dated Feb. 2, 2016 with English Language Translation.
English Language Abstract and Translation for JP 2009-214323 published Sep. 24, 2009.
English Language Abstract and Translation for JP 2010-080680 published Apr. 8, 2010.
English Language Abstract and Translation for JP 2007-165812 published Jun. 28, 2007.
English Language Abstract and Translation for JP 2010-525968 published Jul. 29, 2010.

* cited by examiner

TRANSFER DEVICE, MOLDED MATERIAL AND TRANSFER METHOD

CROSS REFERENCE TO RELATED APPLICATIONS

This application is based on and claims priority of Japanese Patent Application No. 2012-191781, filed on Aug. 31, 2012.

BACKGROUND OF THE INVENTION

Field of the Invention

The present invention relates to a transfer device, a molded material and a transfer method, in particular, for transferring a fine transfer pattern.

Description of the Related Art

Research and development of a nanoimprint technology are being carried out, in which a fine or ultrafine transfer pattern is formed on a quartz substrate by electron beam lithography to prepare a mold, and the mold is pressed against a molded product at a predetermined pressure, so as to transfer the transfer pattern formed on the mold to the molded product (refer to Precision Engineering Journal of the International Societies for Precision Engineering and Nanotechnology 25 (2001) 192-199).

For example, such a transfer is carried out as follows.

First, as shown in FIG. 12A, a molded material 305 and a mold 309 are placed to face each other. The molded material 305 includes a plate-like substrate 301, and uncured ultraviolet curable resin 303 formed into a thin film on one surface in the thickness direction of the plate-like substrate 301. The mold 309 is formed into a plate-like shape made of metal such as nickel. A fine transfer pattern 307 is formed on one surface of the mold 309 in the thickness direction.

Next, as shown in FIG. 12B, the mold 309 presses the molded material 305 so that the transfer pattern 307 comes into contact with the ultraviolet curable resin 303. An ultraviolet ray generation unit 311 then irradiates the ultraviolet curable resin 303 with ultraviolet rays so as to cure it.

Then, as shown in FIG. 12C, the mold 309 is separated from the molded material 305. Accordingly, the molded material 305 provided with the cured ultraviolet curable resin 303 to which the transfer pattern is transferred, is obtained.

SUMMARY OF THE INVENTION

In the conventional transfer process, the mold (the master mold) 309 used is made of metal that does not transmit ultraviolet rays. Therefore, the ultraviolet rays are irradiated necessarily through the substrate 301 in order to cure the ultraviolet curable resin 303. This limits the configuration of the molded material 305.

The present invention has been accomplished in view of the conventional problem. It is an object of the present invention to provide a transfer device and a transfer method used for transferring a fine transfer pattern formed on a master mold to a molded material and capable of increasing the choice of configurations of a molded material.

A first aspect of the present invention provides a transfer device that transfers a fine transfer pattern formed on a sheet-like mold to a molded material, the transfer device comprising: a first transfer unit that transfers the fine transfer pattern formed on the master mold to a replica mold made from a material that transmits light; and a second transfer unit that transfers a fine transfer pattern formed on the replica mold by the first transfer unit to the molded material.

The transfer device may include a master replica mold placement unit and a replica mold winding unit. The replica mold may extend and be stretched out by a predetermined tension between a master replica mold placed on the master replica mold placement unit and the replica mold winding unit.

The first transfer unit may be composed of a master mold holding body that holds the master mold, a transfer roller and a removal roller. The transfer roller may hold, together with the master mold holding body, the replica mold and the master mold held by the master mold holding body, the transfer roller rotating about a central axis thereof to move with respect to the master mold holding body, so as to move the master mold and the replica mold held to carry out a transfer. The removal roller may be located towards the second transfer unit on the side away from the transfer roller of the first transfer unit. The replica mold held by the transfer roller and adhered to the master mold may be wound on the removal roller. The removal roller may rotate about a central axis thereof to move with respect to the master mold holding body together with the transfer roller, so as to wind up the replica mold to separate from the master mold.

The first transfer unit may include a cylindrical master mold. The replica mold may be wound on the master mold to carry out a transfer.

The second transfer unit may be composed of a molded material holding body that holds the molded material, a transfer roller and a removal roller. The transfer roller may hold, together with the molded material holding body, the wound replica mold and the molded material held by the molded material holding body, the transfer roller rotating about a central axis thereof to move with respect to the molded material holding body, so as to move the replica mold and the molded material held to carry out a transfer. The removal roller may be located on the side away from the first transfer unit with the transfer roller interposed therebetween. The replica mold held by the transfer roller and adhered to the molded material may be wound on the removal roller. The removal roller may rotate about a central axis thereof to move with respect to the molded material holding body together with the transfer roller, so as to wind up the replica mold to separate from the molded material.

A second aspect of the present invention provides a molded material on which a fine transfer pattern is formed by use of the transfer device A third aspect of the present invention provides a transfer method of transferring a fine transfer pattern formed on a master mold to a molded material, the method comprising: a first transfer process of transferring the fine transfer pattern formed on the master mold to a replica mold made from a material that transmits light; and a second transfer process of transferring a fine transfer pattern framed on the replica mold in the first transfer process to the molded material.

According to the present invention, the transfer device and the transfer method used for transferring the fine transfer pattern formed on the master mold to the molded material, are capable of increasing the choice of configurations of the molded material.

DESCRIPTION OF THE EMBODIMENTS

A transfer device 1 according to an embodiment of the present invention transfers, to a molded material W, a fine transfer pattern MA1 formed on one surface of a master mold MA in the thickness direction. The master mold MA is formed into a sheet-like (thin plate-like) shape made of metal such as nickel or a material that does not transmit ultraviolet rays.

Figure 12A:
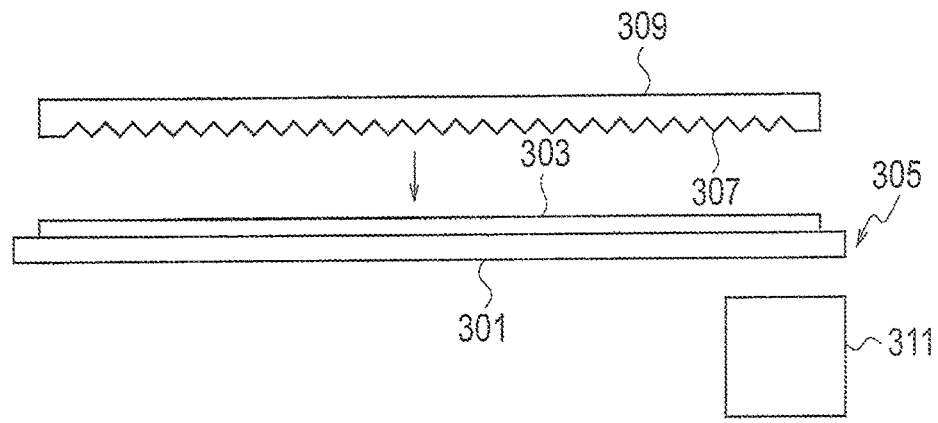
FIGS. 12A to 12C are explanatory views of a transfer state.
Figure 12B:
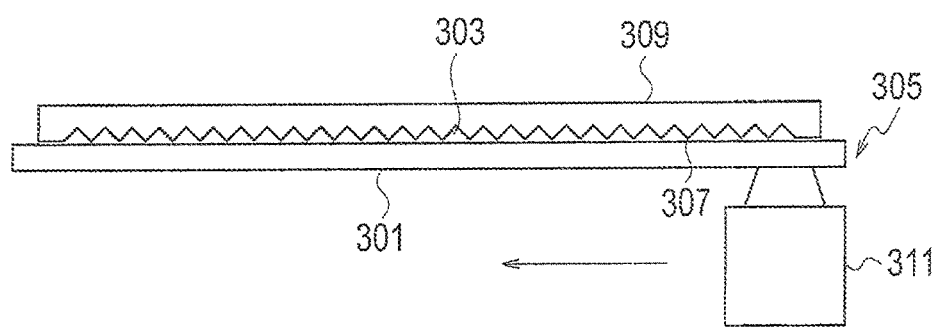
Figure 12C:
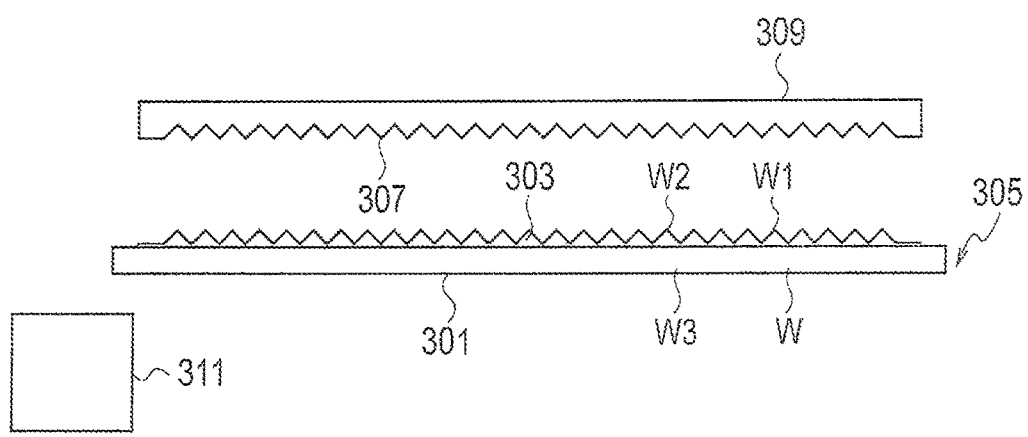

The transfer device 1 produces the molded material W provided with a fine transfer pattern W1 (refer to FIG. 12C). The molded material W is used for, for example, optical elements such as light guide panels and optical filters.

In the following explanations, for reasons of convenience, the two directions perpendicular to each other on the horizontal plane are defined as an X axis direction and a Y axis direction, and the direction vertical to the horizontal plane of the X axis direction and the Y axis direction is defined as a Z axis direction.

Figure 1:
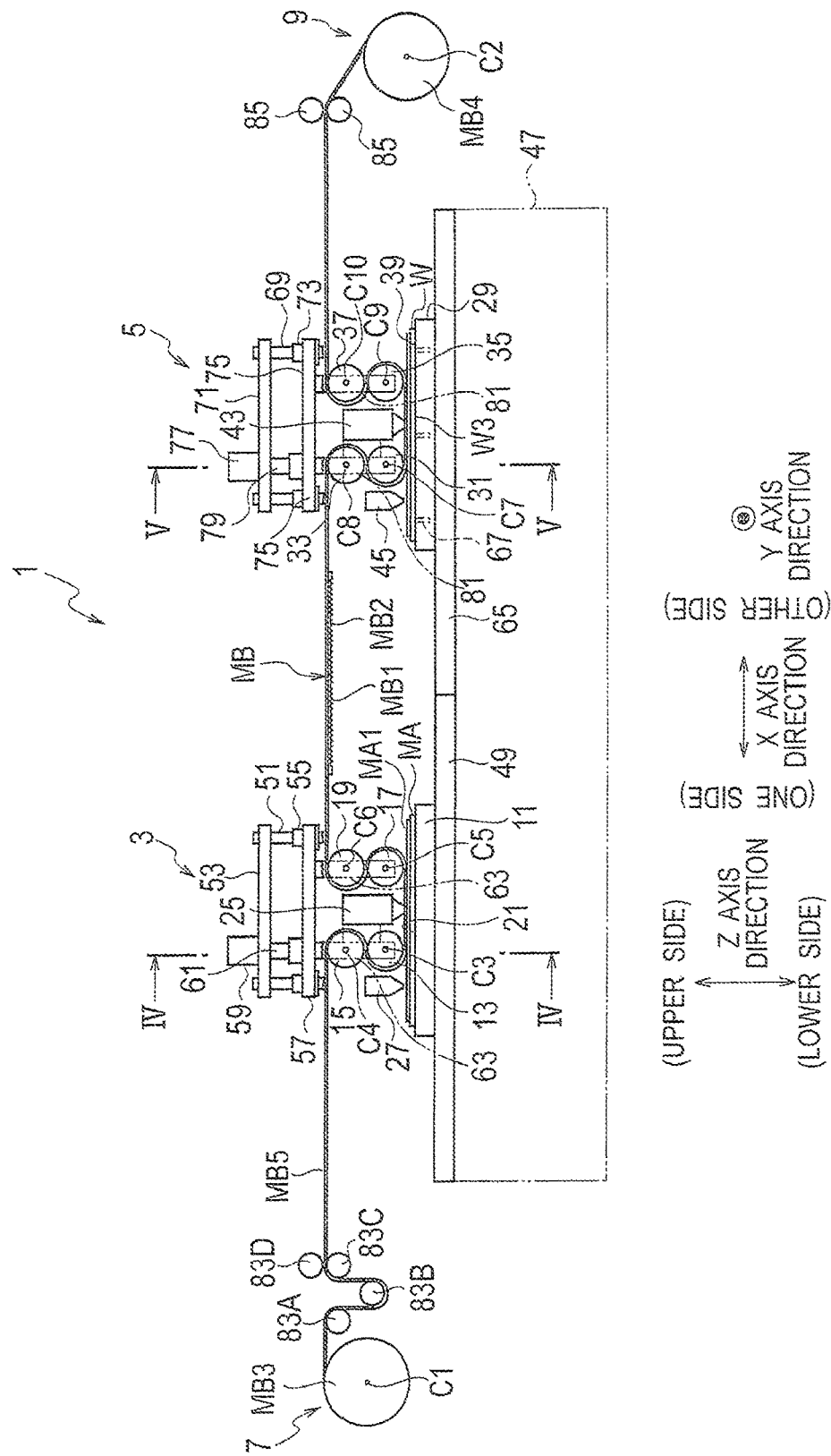
FIG. 1 shows a schematic configuration of a transfer device according to an embodiment of the present invention.

The transfer device 1 includes a first transfer unit 3 and a second transfer unit 5 as shown in FIG. 1.

The first transfer unit 3 transfers the fine transfer pattern MA1 of the master mold MA to a molded product MB1 of a replica mold MB. The replica mold MB is formed into a sheet-like shape made from a material that transmits ultraviolet rays.

Namely, the first transfer unit 3 produces the replica mold MB in a manner as to transfer the fine transfer pattern MA1 of the master mold MA to the molded product MB1 of the replica mold MB.

The second transfer unit 5 transfers a fine transfer pattern MB2 of the replica mold MB to the molded material W.

Namely, the second transfer unit 5 produces the molded material W provided with the fine transfer pattern W1 in a manner as to transfer the fine transfer pattern MB2 of the replica mold MB to a molded product W2 of the molded material W.

The replica mold MB is elongated and formed into a sheet-like shape, and extends from the first transfer unit 3 to the second transfer unit 5. The replica mold MB present in the first transfer unit 3 is connected to the replica mold MB present in the second transfer unit 5.

The replica mold MB provided with the fine transfer pattern MB2 in the first transfer unit 3 is moved to the second transfer unit 5 to be used for the transfer to the molded material W.

The replica mold MB has flexibility. Although the replica mold MB is a rigid body and is hardly elastically deformed even if a tensile force is applied thereto in a direction perpendicular to the thickness direction of the replica mold MB, the replica mold MB is deformable to curl up in the thickness direction in a manner similar to paper currency. In other words, the replica mold MB is deformable by the moment around the axis extending in a direction perpendicular to the thickness direction. Therefore, the replica mold MB can be easily wound on peripheries of rollers in a state where the thickness direction corresponds to the radial direction of the rollers.

The transfer in the first transfer unit 3 is carried out concurrently (in parallel) with the transfer in the second transfer unit 5. For example, when the transfer is carried out by the first transfer unit 3, the transfer in the second transfer unit 5 is also carried out.

The transfer device 1 includes a master replica mold placement unit 7 and a replica mold winding unit 9. A master replica mold MB3 is attached to the master replica mold placement unit 7. The master replica mold MB3 is a roll of the replica mold M having not yet been used for transfer (namely, a blank mold). The replica mold winding unit 9 winds up the master replica mold MB3 drawn from the master replica mold placement unit 7. Namely, the replica mold winding unit 9 winds up the used replica mold M to collect it as a wound roll MB4

The replica mold MB is stretched out in a sheet-like (plate-like) state at a predetermined tension between the master replica mold placement unit 7 and the replica mold winding unit 9 while being wound on plural rollers (rollers 13).

The predetermined tension is applied to the sheet-like replica mold MB in a plate-like state in the longitudinal direction (for example, in the horizontal direction connecting the master replica mold placement unit 7 and the replica mold winding unit 9; the X axis direction). This tension keeps the replica mold MB in the plate-like state extending in the X axis direction and in the Y axis direction.

Although not shown in FIG. 6, FIG. 7, FIG. 9 and FIG. 10, the fine transfer pattern MB2 of the replica mold MB is provided on the lower surface of the plate-like replica mold MB (refer to FIG. 1).

As described above, the master replica mold MB3 is a roll of the replica mold MB having not yet been used for transfer. The master replica mold MB3 is formed into a cylindrical shape or a column in a manner such that the sheet-like replica mold MB (in particular, a mold substrate material MB5 described below) is wound on the circumference of a cylindrical core material in a state where the circumferential direction of the core material corresponds to the longitudinal direction of the sheet-like replica mold M.

Once the replica mold MB is used for the transfer, the replica mold MB is rolled up by the replica mold winding unit 9 to form the replica mold (the wound roll) MB4 wound up in a rolled state similar to the master replica mold MB3.

The master replica mold MB3 rotates about its central axis (for example, an axis extending in the Y axis direction; an axis extending in the direction perpendicular to the plane of paper of FIG. 1) C1. The wound up replica mold MB4 also rotates about its central axis (an axis extending in the horizontal direction parallel to the axis C1) C2.

Figure 2:
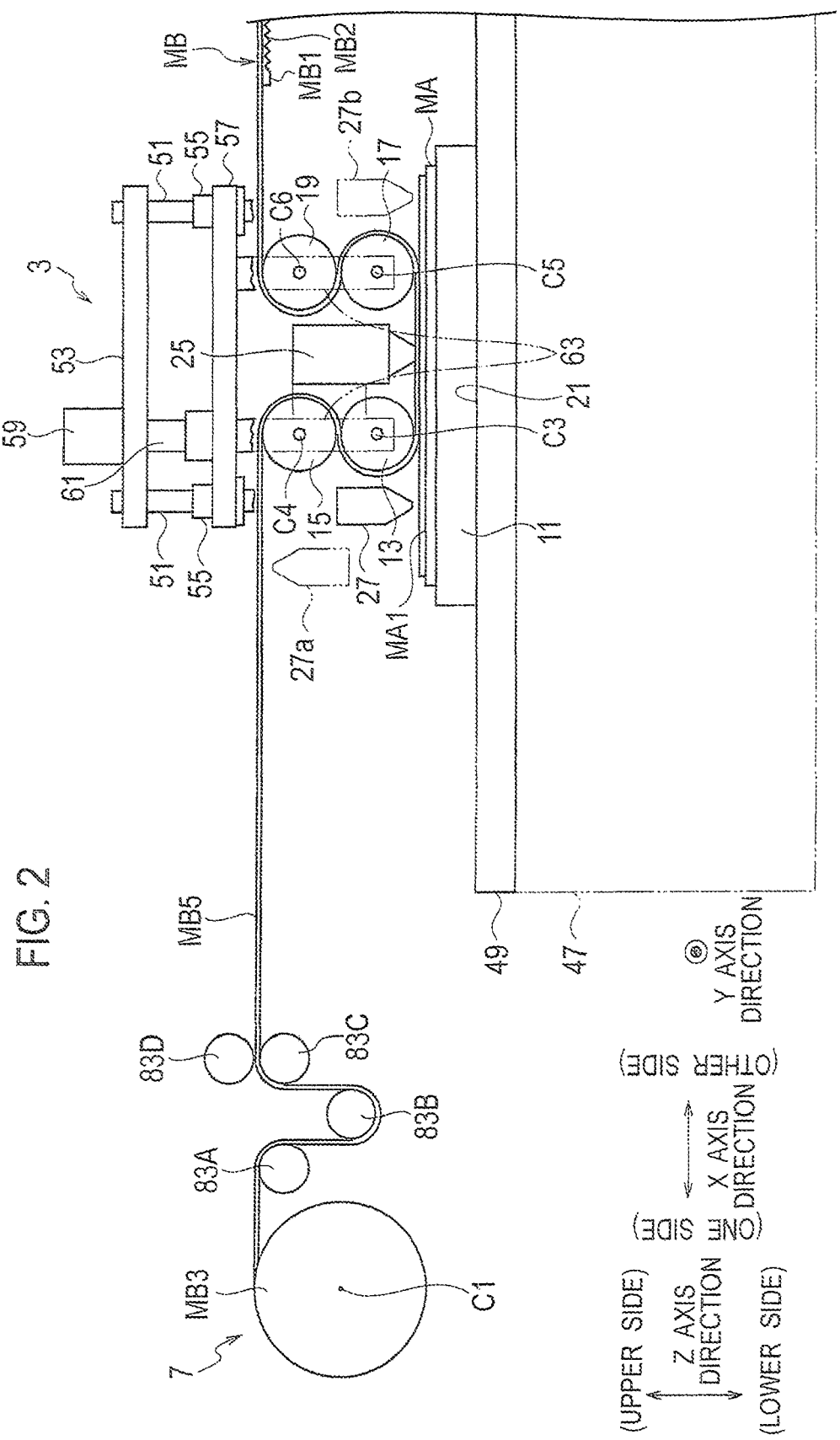
FIG. 2 shows a schematic configuration of a first transfer unit of the transfer device according to the present invention.

The first transfer unit 3 includes, as shown in FIG. 2, a master mold support body (a master mold mounting body) 11 that holds the master mold MA, a cylindrical first roller 13, a cylindrical second roller 15, a cylindrical third roller 17 and a cylindrical fourth roller 19.

A strip of replica mold MB extends in the longitudinal direction (for example, in the X axis direction) and is sequentially wound on the second roller 15, the first roller 13, the third roller 17 and the fourth roller 19.

The first roller (the transfer roller) 13 holds, together with the master mold holding body 11, the wound replica mold MB and the master mold MA held by the master mold holding body 11 to carry out the transfer. The first roller 13 rotates about the central axis (the axis extending in the Y axis direction) C3 to move in the X axis direction (from the right to the left in FIG. 1) with respect to the master mold holding body 11. The master mold MA and the replica mold MB held also move in association with the movement of the first roller 13.

The second roller (the transfer guide roller) 15 is a predetermined distance from the master mold holding body 11 in the Z axis direction (towards the upper side in FIG. 1) with the first roller 13 interposed therebetween.

The replica mold MB extends from the first roller 13 in the direction away from the master mold holding body 11 to be wound on the second roller 15.

The replica mold MB is wound on the first roller 13 and extends therefrom in the direction away from the third roller 17. The replica mold MB is further wound around the second roller 15 on the side away from the master mold MA held by the master mold holding body 11.

The second roller 15 rotates, in synchronization with the first roller 13, about the central axis C4 parallel to the central axis C3 of the first roller 13, and moves with respect to the master mold holding body 11 together with the first roller 13.

The third roller (the removal roller) 17 is located towards the second transfer unit 5 on the opposite side of the first roller 13 in the X axis direction. The replica mold MB held by the first roller 13 and adhered to the master mold MA is wound on the third roller 17.

The third roller 17 rotates, in synchronization with the first roller 13, about the central axis C5 parallel to the central axis C3 of the first roller 13. The third roller 17 moves with respect to the master mold holding body 11 together with the first roller 13. The replica mold MB is wound on the third roller 17 in association with the movement of the third roller 17 so as to be separated from the master mold MA.

In other words, the third roller 17 also holds, together with the master mold holding body 11, the replica mold MB and the master mold MA held by the master mold holding body 11 as in the case of the first roller 13.

The fourth roller (the removal guide roller) 19 is a predetermined distance from the master mold holding body 11 in the Z axis direction (towards the upper side in FIG. 1) with the third roller 17 interposed therebetween, as in the case of the second roller 15. The replica mold MB is wound on the third roller 17 and extends therefrom in the direction away from the first roller 13. The replica mold MB is further wound around the fourth roller 19 on the side away from the master mold MA held by the master mold holding body 11.

The fourth roller 19 rotates, in synchronization with the third roller 17, about the central axis C6 parallel to the central axis C5 of the third roller 17. The fourth roller 19 moves with respect to the master mold holding body 11 together with the first roller 13.

The first roller 13 presses the replica mold MB against the master mold MA at the point of transfer.

The second roller 15 guides the replica mold MB at the point of transfer and at the same time, serves as a backup roller for the first roller 13. Note that the backup roller represents a roller to prevent deformation of the adjacent roller (namely the first roller 13).

As described above, the third roller 17 removes the replica mold MB from the master mold MA after the transfer.

The fourth roller 19 guides the replica mold MB after the transfer and at the same time, serves as a backup roller for the third roller 17.

The transfer pattern MA1 (the transfer pattern MB2) has a corrugated structure with a pitch and height similar to, for example, the wavelength of visible light. The transfer pattern MA1 is transferred to the replica mold MB formed as the inverted transfer pattern MB2 by the first transfer unit 3.

Further, the transfer pattern MB2 is transferred to the molded material W formed as the inverted transfer pattern W1 by the second transfer unit 5.

The sheet-like replica mold MB is composed of the sheet-like substrate (the mold substrate) MB5 and the transfer pattern formation material (the molded product) MB1. The transfer pattern MB2 is formed on the transfer pattern formation material MB1.

The mold substrate MB5 is formed into a sheet-like (plate-like) shape made from, for example, an ultraviolet-transmitting resin material such as PET resin.

The transfer pattern formation material MB1 is a thin film made of resin. This resin is ultraviolet-transmitting resin, such as ultraviolet curable resin, thermoset resin or thermoplastic resin. The transfer pattern formation material MB1 is integrally formed on one surface of the mold substrate MB5 in the thickness direction in a state where the thickness direction of the transfer pattern formation material MB1 corresponds to that of the mold substrate MB5.

The transfer pattern MB2 is formed on one surface of the transfer pattern formation material MB1 in the thickness direction, the one surface being the surface not in contact with the mold substrate MB5.

The mold substrate MB5 is formed into, for example, a long rectangular plate-like (band plate) shape. The dimension in the width direction of the mold substrate MB5 is much greater than the dimension in the thickness direction of the mold substrate MB5. The dimension in the longitudinal direction of the mold substrate MB5 is much greater than the dimension in the width direction of the mold substrate MB5.

The transfer pattern formation material MB1 is also formed into, for example, a rectangular plate-like shape. The transfer pattern formation material MB1 is provided on the mold substrate MB5 in a state where the width direction and the longitudinal direction of the transfer pattern formation material MB1 correspond to those of the mold substrate MB5.

The plural transfer pattern formation materials MB1 are intermittently provided on the mold substrate MB5 at predetermined intervals in the longitudinal direction of the mold substrate MB5. Alternatively, the transfer pattern formation materials MB1 may be provided sequentially in the longitudinal direction of the mold substrate MB5. The width of each of the transfer pattern formation materials MB1 is smaller than that of the mold substrate MB5.

The mold substrate MB5 includes areas where the transfer pattern formation materials MB1 are not provided. The areas extend sequentially in the longitudinal direction of the mold substrate MB5. These areas are provided, for example, in a manner such that each of the transfer pattern formation materials MB1 is smaller in width than the mold substrate MB5. In such a case, the areas are provided as MB6 where only the mold substrate MB5 is provided on both sides in the width direction of the replica mold MB (refer to FIG. 4 and FIG. 5).

The master mold holding body 11 is formed into, for example, a rectangular plate-like shape. The master mold holding body 11 has a flat surface (one surface in the thickness direction; the upper surface; the master mold mounting surface) 21 to hold the master mold MA. The rear surface of the master mold MA entirely comes into contact with the master mold mounting surface 21 of the master mold holding body 11, and is held by the master mold holding body 11 by means of, for example, vacuum suction. Note that the rear surface represents that which is not the surface on which the fine transfer pattern MA1 is provided. The width direction and the longitudinal direction of the master mold MA mounted on the master mold holding body 11, correspond to the width direction (the Y axis direction) and the longitudinal direction (the X axis direction) of the master mold holding body 11, respectively.

The outer diameter of each of the first roller 13, the second roller 15, the third roller 17 and the fourth roller 19 are substantially the same. The length (width) of each of the first roller 13, the second roller 15, the third roller 17 and the fourth roller 19 are substantially the same.

The positions of the first roller 13, the second roller 15, the third roller 17 and the fourth roller 19 correspond to each other in the width direction (in the Y axis direction).

The positions of the first roller 13 and the third roller 17 correspond to each other in the vertical direction (in the Z axis direction). The positions of the second roller 15 and the fourth roller 19 correspond to each other in the vertical direction (in the Z axis direction) above the first roller 13.

The positions of the first roller 13 and the second roller 15 correspond to each other in the X axis direction. The positions of the third roller 17 and the fourth roller 19 correspond to each other in the X axis direction. The third roller 17 and the fourth roller 19 are located towards the second transfer unit 5 on the opposite side of the first roller 13.

The length of the first roller 13 is slightly larger than the width of the master mold MA held by the master mold holding body 11. The extending direction (the width direction; the Y axis direction) of the central axis C3 of the first roller 13 corresponds to the width direction of the master mold MA held by the master mold holding body 11. The center in the width direction of the first roller 13 corresponds to the center in the width direction of the master mold MA held by the master mold holding body 11.

The first roller 13 is movable to be placed in any position in the direction perpendicular to the master mold mounting surface 21 of the master mold holding body 11 (in the Z axis direction).

When the replica mold MB and the master mold MA held by the master mold holding body 11 are inserted and held between the first roller 13 and the master mold holding body 11, the distance between the central axis C3 of the first roller 13 and the master mold mounting surface 21 is substantially the same as, or slightly smaller than the sum of the radius of the first roller 13, the thickness of the master mold MA and the thickness of the replica mold MB. Thus, the replica mold MB and the master mold MA can be held between the first roller 13 and the master mold holding body 11.

The width direction of the replica mold MB wound on the first roller 13 corresponds to the width direction of the first roller 13. The center in the width direction of the replica mold MB wound on the first roller 13 substantially corresponds to the center in the width direction of the first roller 13. The replica mold MB is wound halfway around the first roller 13.

Figure 4:
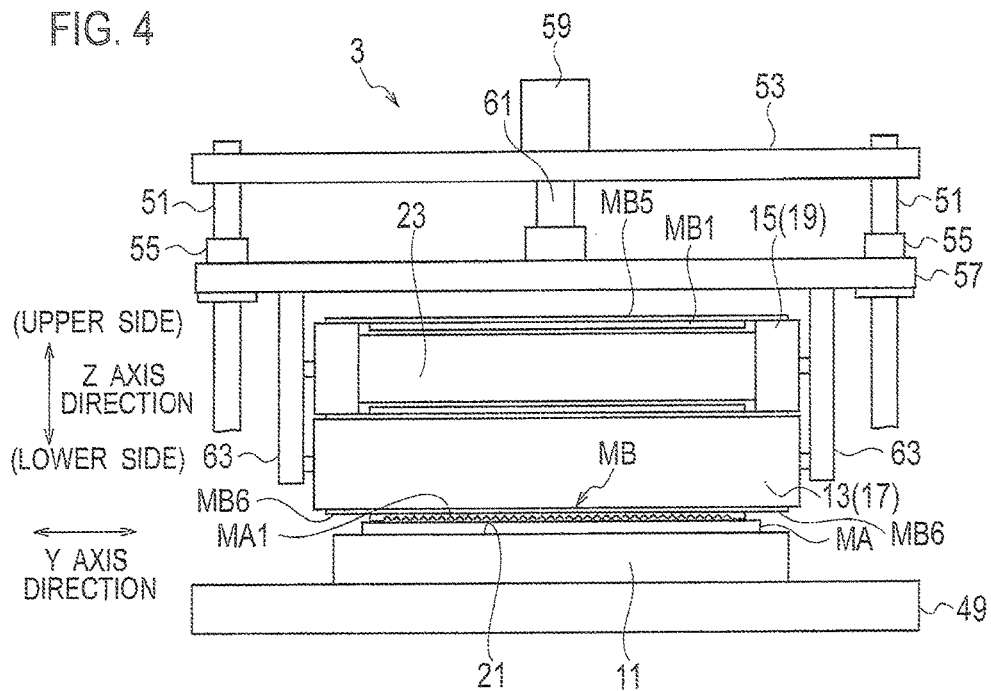
FIG. 4 is a cross-sectional view along the line IV-IV in FIG. 1.

The rear surface of the mold substrate MB5 of the replica mold MB wound on the first roller 13 is in contact with the outer surface of the first roller 13 (refer to FIG. 4). Note that the rear surface represents that which is not the surface on which the transfer pattern formation material MB1 is provided.

The replica mold MB is wound on the first roller 13 and held between the first roller 13 and the master mold holding body 11, and extends towards the other end (towards the right in FIG. 1) of the master mold holding body 11 in the longitudinal direction (in the X axis direction) parallel to the master mold mounting surface 21. In the state where the replica mold MB is held between the first roller 13 and the master mold holding body 11 and extends therefrom, the replica mold MB is separated from the master mold mounting surface 21 by the thickness of the master mold MA.

The replica mold MB is wound on the first roller 13, and further wound halfway around the second roller 15 in the direction opposite to the direction in which the replica mold MB is wound on the first roller 13. When viewed from the extending direction (in the Y axis direction) of the central axes C3 and C4 of the first roller 13 and the second roller 15, the replica mold MB wound on the first roller 13 and the second roller 15 forms an S-shape or an inverted S-shape.

The central axis C4 of the second roller 15 is located to be a predetermined distance from the central axis C3 of the first roller 13. The second roller 15 is configured to be movable to be placed in any position, in association with the first roller 13, in the direction perpendicular to the master mold mounting surface 21 of the master mold holding body 11 (in the Z axis direction).

The replica mold MB extends towards the left in FIG. 1 from the top of the second roller 15. The replica mold MB also extends towards the right from the bottom of the first roller 13. The extending directions of the replica mold MB described above are parallel to each other. In other words, the longitudinal direction of the replica mold MB extending from the first roller 13 corresponds to the longitudinal direction of the replica mold MB extending from the second roller 15. Further, the thickness direction of the replica mold MB extending from the first roller 13 corresponds to the thickness direction of the replica mold MB extending from the second roller 15.

The distance between the replica mold MB extending from the top of the second roller 15 and the master mold holding body 11 in the Z axis direction, is slightly greater than the sum of the diameter of the first roller 13 and the diameter of the second roller 15.

When the replica mold MB and the master mold MA are held between the first roller 13 and the master mold holding body 11, the distance between the central axis C5 of the third roller 17 and the master mold mounting surface 21 is equivalent to the distance between the central axis C3 of the first roller 13 and the master mold mounting surface 21.

The replica mold MB is wound halfway around the third roller 17 as in the case of the first roller 13.

The rear surface of the mold substrate MB5 is in contact with the outer surface of the third roller 17 as in the case of the first roller 13.

The replica mold MB is wound on the third roller 17, and further wound halfway around the fourth roller 19 in the direction opposite to the direction in which the replica mold MB is wound on the third roller 17. When viewed from the extending direction of the central axes C5 and C6 of the third roller 17 and the fourth roller 19 (from the Y axis direction), the replica mold MB wound on the third roller 17 and the fourth roller 19 forms an S-shape or an inverted S-shape, as in the case of the first roller 13 and the second roller 15.

The central axis C5 of the third roller 17 and the central axis C6 of the fourth roller 19 are each a constant distance from the central axis C3 of the first roller 13. The third roller 17 and the fourth roller 19 are configured to be movable to be placed in any position in the direction perpendicular to the master mold mounting surface 21 of the master mold holding body 11 (in the Z axis direction).

The replica mold MB extends from the top of the fourth roller 19 towards the right in FIG. 1. The replica mold MB also extends from the bottom of the third roller 17 towards the left in FIG. 1. The extending directions of the replica mold MB described above are parallel to each other.

The distance between the replica mold MB extending from the top of the fourth roller 19 and the master mold holding body 11 is slightly greater than the sum of the diameter of the third roller 17 and the diameter of the fourth roller 19.

The first roller 13, the second roller 15, the third roller 17 and the fourth roller 19 are configured to be movable with respect to the master mold holding body 11 in the longitudinal direction of the master mold MA (in the X axis direction). In particular, the first roller 13, the second roller 15, the third roller 17 and the fourth roller 19 move between the position slightly separated from one end of the master mold holding body 11 (refer to FIG. 6) and the position slightly separated from the other end of the master mold holding body 11 (refer to FIG. 8), in the longitudinal direction of the master mold holding body 11.

The fourth roller 19 includes a small diameter portion 23 to avoid contact with the transfer pattern formation body MB1 of the wound replica mold MB (refer to FIG. 4).

Figure 6:
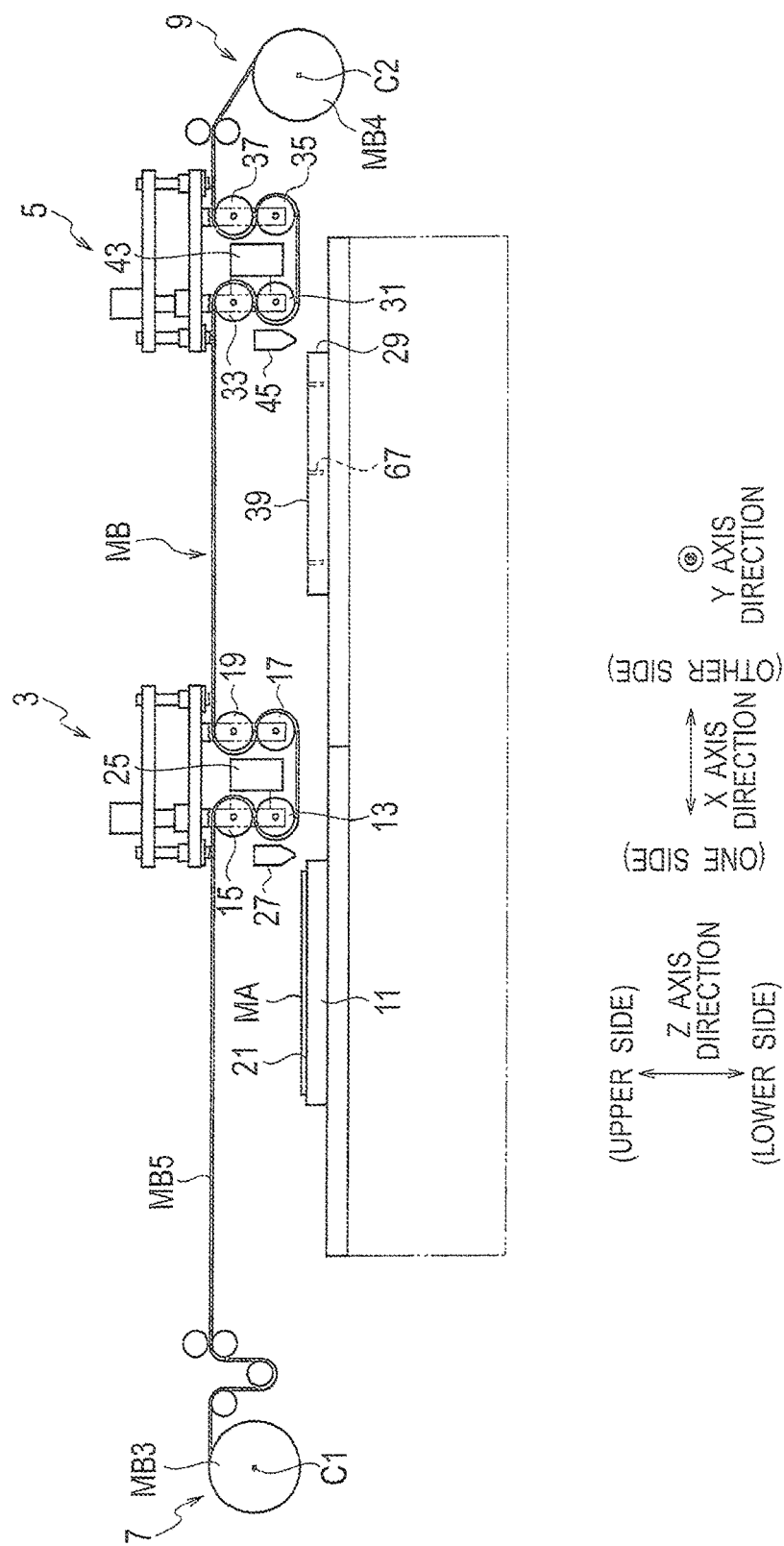
FIG. 6 shows the operation of the transfer device according to the embodiment of the present invention.
Figure 7:
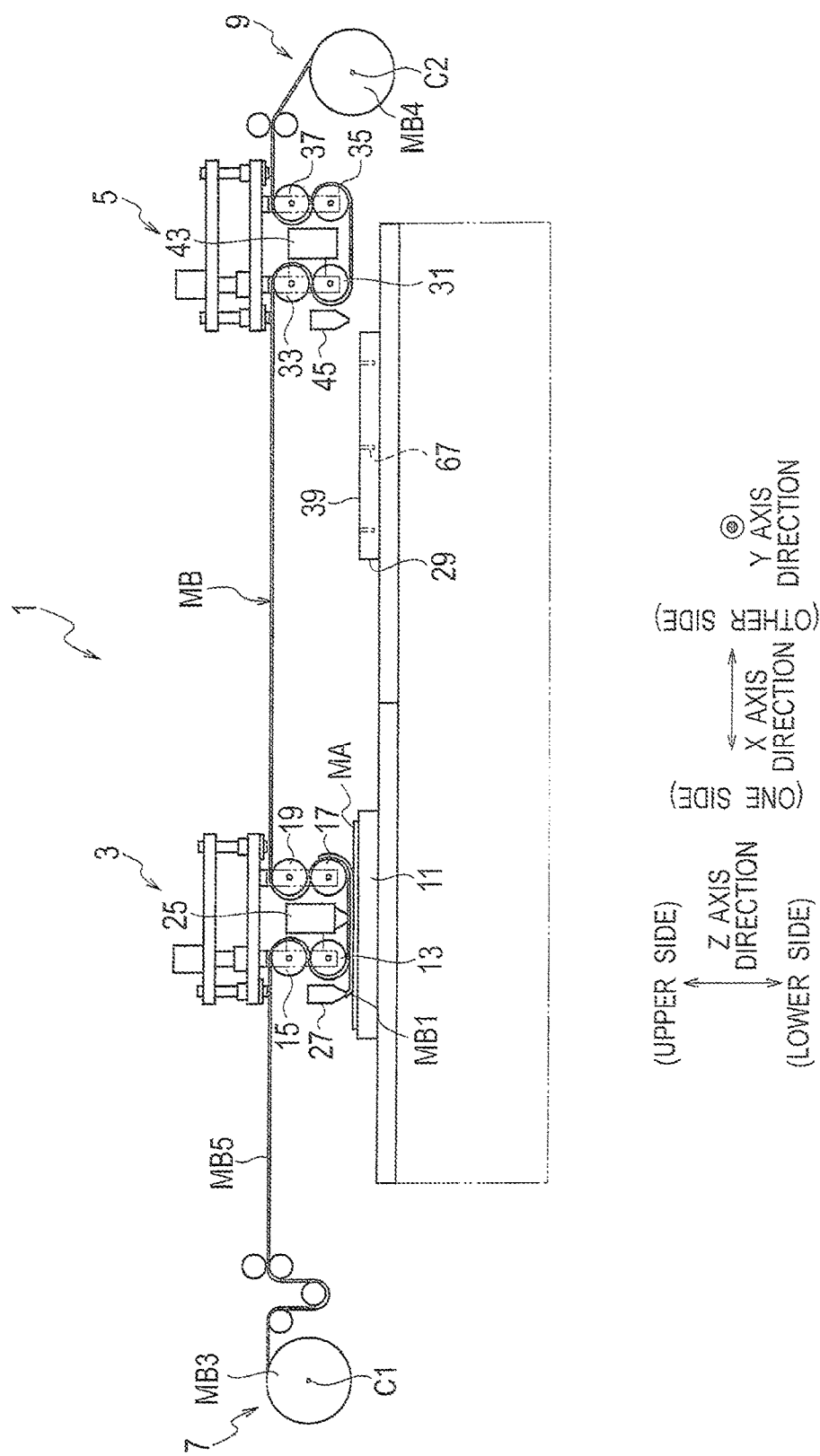
FIG. 7 shows the operation of the transfer device according to the embodiment of the present invention.

In the initial state shown in FIG. 6, (i) the master mold MA is placed on the master mold holding body 11, (ii) the replica mold MB is wound on the respective rollers 13, 15, 17 and 19, (iii) the first roller 13 and the third roller 17 are separated from the master mold mounting surface 21 approximately by the distance corresponding to the sum of the thickness of the master mold MA and the thickness of the replica mold MB (by the distance required for the transfer) in the direction perpendicular to the master mold mounting surface 21 (in the Z axis direction), and (iv) the respective rollers 13, 15, 17 and 19 are located at the position slightly separated from one end of the master mold holding body 11 in the longitudinal direction. In the initial state, the replica mold MB extending from the top of the second roller 15 is located immediately above the master mold holding body 11. The replica mold MB extending from the first roller 13 towards the third roller 17 is separated from the master mold holding body 11.

Figure 3:
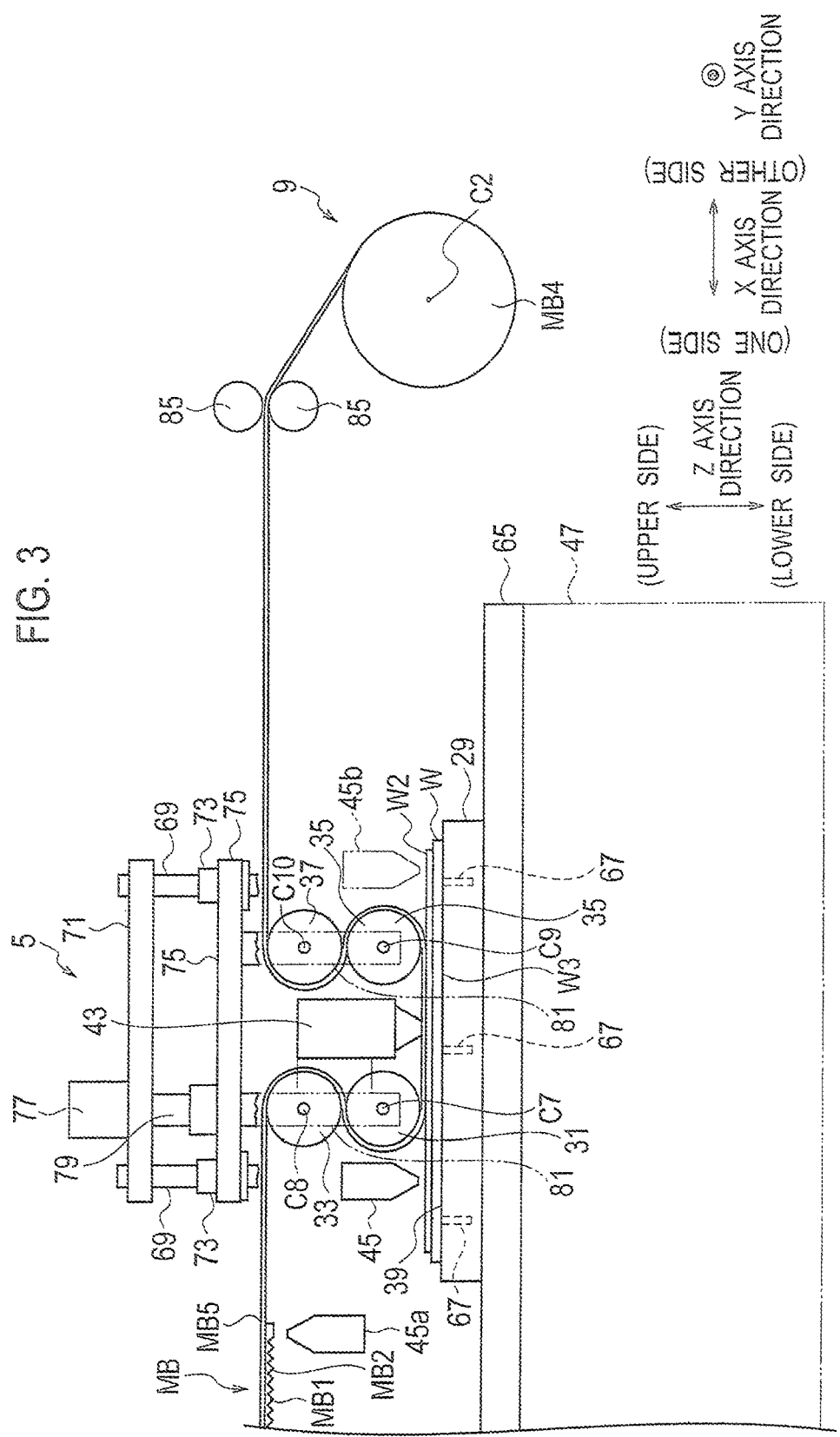
FIG. 3 shows a schematic configuration of a second transfer unit of the transfer device according to the present invention.

When viewing the initial state in the direction perpendicular to the master mold mounting surface 21 (in the Z axis direction), the part of the replica mold MB extending towards the left from the top of the second roller 15 in FIG. 3 overlaps the master mold mounting surface 21, and the part of the replica mold MB extending from the bottom of the first roller 13 towards the third roller 35 (towards the right) is separated from the master mold mounting surface 21.

When the respective rollers 13, 15, 17 and 19 move to one side (towards the left) in the longitudinal direction (the X axis direction) of the master mold holding body 11 from the initial state, the replica mold MB and the master mold MA held between the first roller 13 and the master mold holding body 11 (the linear part extending in the width direction of the master mold holding body 11) also move from the right to the left. Note that, at this point, the replica mold MB does not slip on the respective rollers 13, 15, 17 and 19, or on the master mold MA. The first roller 13 and the third roller 17 interpose the replica mold MB therebetween to form a rolling pair with respect to the master mold MA on the master mold holding body 11.

In the case where the transfer pattern formation material MB1 is ultraviolet curable resin, the transfer device 1 is provided with an ultraviolet ray generation unit 25 to cure the transfer pattern formation material MB1. The ultraviolet ray generation unit 25 is moved and positioned together with the respective rollers 13, 15, 17 and 19. The ultraviolet ray generation unit 25 irradiates the area where the master mold MA and the replica mold MB are held between the first roller 13 and the master mold holding body 11 (between the first roller 13 and the third roller 17), with ultraviolet rays to cure the transfer pattern formation material MB1. As a result, the pattern corresponding to the fine transfer pattern MB2 are provided on the transfer pattern formation material MB1.

Namely, when the respective rollers 13, 15, 17 and 19 are moving in the X axis direction, the ultraviolet ray generation unit 25 performs the irradiation at the rear side of the rollers 13 and 15. The transfer pattern formation material MB1 is irradiated with the ultraviolet rays through the mold substrate MB5. Due to the irradiation with the ultraviolet rays, the transfer pattern formation material MB1 is cured. In FIG. 6, the transfer pattern formation material MB1 is cured sequentially from the right to the left.

When the respective rollers 13, 15, 17 and 19 are moving in the X axis direction, the third roller 17 and the fourth roller 19 wind up the replica mold MB, and remove (separate), from the master mold MA, the replica mold MB adhered to the master mold MA on the master mold holding body 11. The separated replica mold MB is used for the transfer in the second transfer unit 5.

The first transfer unit 3 is provided with a nozzle 27. The nozzle 27 provides the uncured transfer pattern formation material MB1 in a film state on the master mold MA. The nozzle 27 is provided upstream of the rollers 13 and 15 (on the opposite side from the rollers 17 and 19 with the rollers 13 and 15 interposed therebetween). The nozzle 27 is moved and positioned in association with the respective rollers 13, 15, 17 and 19.

Alternatively, the nozzle 27 may be provided in the position indicated by reference numeral 27a in FIG. 2 so as to provide the uncured transfer pattern formation material MB1 on the lower surface of the mold substrate MB5. In this case, as shown in FIG. 4, the second roller 15 is provided with the small diameter portion 23 to avoid contact with the transfer pattern formation material MB1 of the replica mold MB. The nozzle 27 may also be provided in the position indicated by reference numeral 27b in FIG. 2.

The second transfer unit 5 is explained in more detail below. As mainly shown in FIG. 1, the second transfer unit 5 has substantially the same configuration as the first transfer unit 3, and is located towards the replica mold winding unit 9 on the opposite side of the first transfer unit 3 in the X axis direction.

Namely, as shown in FIG. 3, the second transfer unit 5 includes a molded material support body (a molded material mounting body) 29 that holds the molded material W, a cylindrical first roller 31, a cylindrical second roller 33, a cylindrical third roller 35 and a cylindrical fourth roller 37.

A strip of replica mold MB extends in the longitudinal direction (for example, in the X axis direction) and is sequentially wound on a second roller 33, the first roller 31, a third roller 35 and a fourth roller 37.

The first roller (the transfer roller) 31 holds, together with the molded material holding body 29, the wound replica mold MB and the molded material W held by the molded material holding body 29 to carry out the transfer. The first roller 31 rotates about the central axis (the axis extending in the Y axis direction) C7 to move in the X axis direction (from the right to the left in FIG. 1) with respect to the molded material holding body 29. The replica mold MB and the molded material W held also move in association with the movement of the first roller 31.

The second roller (the transfer guide roller) 33 is a predetermined distance from the molded material holding body 29 in the Z axis direction (towards the upper side in FIG. 1) with the first roller 31 interposed therebetween.

The replica mold MB extends from the first roller 31 in the direction away from the molded material holding body 29 to be wound on the second roller 33.

The replica mold MB is wound on the first roller 31 and extends therefrom in the direction away from the third roller 35. The replica mold MB is further wound around the second roller 33 on the side away from the molded material W held by the molded material holding body 29.

The second roller 33 rotates, in synchronization with the first roller 31, about the central axis C8 parallel to the central axis C7 of the first roller 31, and moves with respect to the molded material holding body 29 together with the first roller 31.

The third roller (the removal roller) 35 is located towards the replica mold winding unit 9 on the opposite side of the first roller 31 in the X axis direction. The replica mold MB held by the first roller 31 and adhered to the molded material W is wound on the third roller 35.

The third roller 35 rotates, in synchronization with the first roller 31, about the central axis C9 parallel to the central axis C7 of the first roller 31. The third roller 35 moves with respect to the molded material holding body 29 together with the first roller 31. The replica mold MB is wound on the third roller 35 in association with the movement of the third roller 35 so as to be separated from the molded material W.

In other words, the third roller 35 also holds, together with the molded material holding body 29, the replica mold MB and the molded material W held by the molded material holding body 29 as in the case of the first roller 31.

The fourth roller (the removal guide roller) 37 is a predetermined distance from the molded material holding body 29 in the Z axis direction (towards the upper side in FIG. 1) with the third roller 35 interposed therebetween, as in the case of the second roller 33. The replica mold MB is wound on the third roller 35 and extends therefrom in the direction away from the first roller 31. The replica mold MB is further wound around the fourth roller 37 in the direction away from the molded material W held by the molded material holding body 29.

The fourth roller 37 rotates, in synchronization with the third roller 35, about the central axis C10 parallel to the central axis C9 of the third roller 35. The fourth roller 37 moves with respect to the molded material holding body 29 together with the first roller 31.

The first roller 31 presses the replica mold MB against the molded material W at the point of transfer.

The second roller 33 guides the replica mold MB at the point of transfer and at the same time, serves as a backup roller for the first roller 31.

As described above, the third roller 35 separates the replica mold MB from the molded material W after the transfer.

The fourth roller 37 guides the replica mold MB after the transfer and at the same time, serves as a backup roller for the third roller 35.

The first roller 31, the second roller 33, the third roller 35 and the fourth roller 37 each have substantially the same configuration as the respective rollers 13, 15, 17 and 19. The positions of the first roller 31, the second roller 33, the third roller 35 and the fourth roller 37 correspond to each other in the width direction (in the Y axis direction), and correspond to the rollers 13, 15, 17 and 19, respectively.

The positions of the first roller 31 and the third roller 35 correspond to each other in the vertical direction (in the Z axis direction). The positions of the second roller 33 and the fourth roller 37 correspond to each other in the vertical direction (in the Z axis direction) above the first roller 31.

The positions of the first roller 31 and the second roller 33 correspond to each other in the X axis direction. The positions of the third roller 35 and the fourth roller 37 correspond to each other in the X axis direction. The third roller 35 and the fourth roller 37 are located towards the replica mold winding unit 9 on the opposite side of the first roller 31.

The length of the first roller 31 is slightly larger than the width of the molded material W held by the molded material holding body 29. The extending direction (the width direction; the Y axis direction) of the central axis C7 of the first roller 31 corresponds to the width direction of the molded material W held by the molded material holding body 29. The center in the width direction of the first roller 31 corresponds to the center in the width direction of the molded material W held by the molded material holding body 29.

The first roller 31 is movable to be placed in any position in the direction perpendicular to the molded material mounting surface 39 of the molded material holding body 29 (in the Z axis direction).

When the replica mold MB and the molded material W held by the molded material holding body 29 are inserted and held between the first roller 31 and the molded material holding body 29, the distance between the central axis C7 of the first roller 31 and the molded material mounting surface 39 is substantially the same as, or slightly smaller than the sum of the radius of the first roller 31, the thickness of the molded material W and the thickness of the replica mold MB. Thus, the replica mold MB and the molded material W can be held between the first roller 13 and the molded material holding body 29.

The width direction of the replica mold MB wound on the first roller 31 corresponds to the width direction of the first roller 31. The center in the width direction of the replica mold MB wound on the first roller 31 substantially corresponds to the center in the width direction of the first roller 31. The replica mold MB is wound halfway around the first roller 31.

Figure 5:
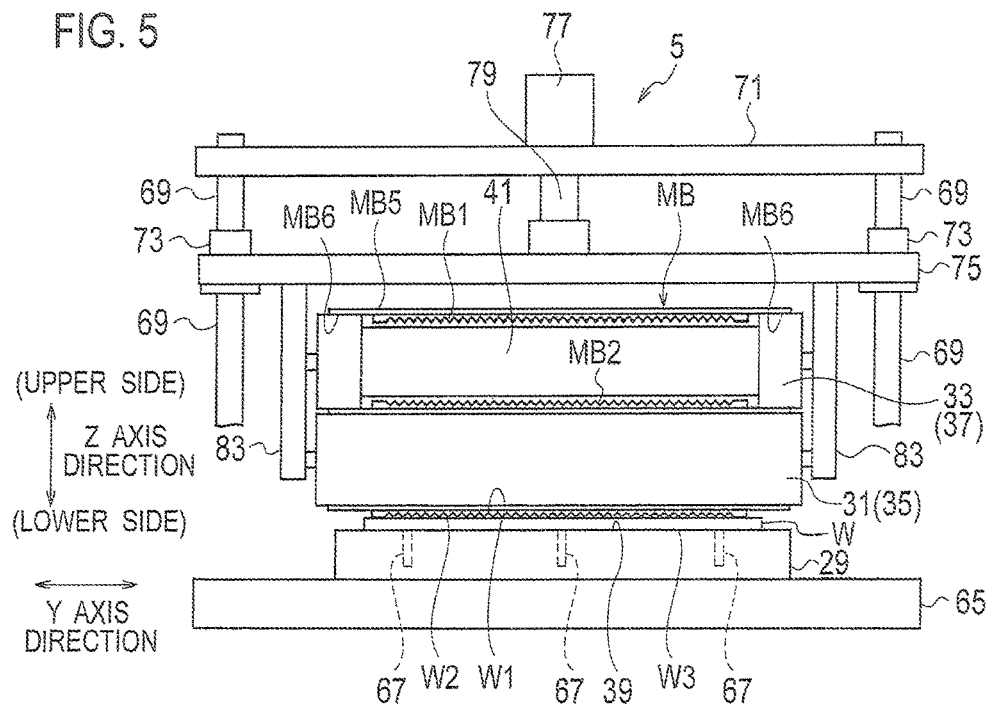
FIG. 5 is a cross-sectional view along the line V-V in FIG. 1.

The rear surface of the mold substrate MB5 of the replica mold MB wound on the first roller 31 is in contact with the outer surface of the first roller 31 (refer to FIG. 5).

The replica mold MB is wound on the first roller 31 and held between the first roller 31 and the molded material holding body 29, and extends towards the other end (towards the right in FIG. 1) of the molded material holding body 29 in the longitudinal direction (in the X axis direction) parallel to the molded material mounting surface 39. In the state where the replica mold MB is held between the first roller 31 and the molded material holding body 29 and extends therefrom, the replica mold MB is separated from the molded material mounting surface 39 by the thickness of the molded material W.

The replica mold MB is wound on the first roller 31, and further wound halfway around the second roller 33 in the direction opposite to the direction in which the replica mold MB is wound on the first roller 31. When viewed from the extending direction (in the Y axis direction) of the central axes C7 and C8 of the first roller 31 and the second roller 33, the replica mold MB wound on the first roller 31 and the second roller 33 forms an S-shape or an inverted S-shape.

The central axis C8 of the second roller 33 is located to be a predetermined distance from the central axis C7 of the first roller 31. The second roller 33 is configured to be movable to be placed in any position, in association with the first roller 31, in the direction perpendicular to the molded material mounting surface 39 of the molded material holding body 29 (in the Z axis direction).

When the replica mold MB and the molded material W are held between the first roller 31 and the molded material holding body 29, the distance between the central axis C9 of the third roller 35 and the molded material mounting surface 39 is equivalent to the distance between the central axis C7 of the first roller 31 and the molded material mounting surface 39.

The replica mold MB is wound halfway around the third roller 35 as in the case of the first roller 31.

The rear surface of the mold substrate MB5 is in contact with the outer surface of the third roller 35 as in the case of the first roller 31.

The replica mold MB is wound on the third roller 35, and further wound halfway around the fourth roller 37 in the direction opposite to the direction in which the replica mold MB is wound on the third roller 35. When viewed from the extending direction of the central axes C9 and C10 of the third roller 35 and the fourth roller 37 (from the Y axis direction), the replica mold MB wound on the third roller 35 and the fourth roller 37 forms an S-shape or an inverted S-shape, as in the case of the first roller 31 and the second roller 33.

The central axis C9 of the third roller 35 and the central axis C10 of the fourth roller 37 are each a constant distance from the central axis C7 of the first roller 31. The third roller 35 and the fourth roller 37 are configured to be movable to be placed in any position in the direction perpendicular to the molded material mounting surface 39 of the molded material holding body 29 (in the Z axis direction).

The replica mold MB extends from the top of the fourth roller 37 towards the right in FIG. 1. The replica mold MB also extends from the bottom of the third roller 35 towards the left in FIG. 1. The extending directions of the replica mold MB described above are parallel to each other.

The distance between the replica mold MB extending from the top of the fourth roller 37 and the molded material holding body 29 is slightly greater than the sum of the diameter of the third roller 35 and the diameter of the fourth roller 37.

The first roller 31, the second roller 33, the third roller 35 and the fourth roller 37 are configured to be movable with respect to the molded material holding body 29 in the longitudinal direction of the molded material W (in the X axis direction). In particular, the first roller 31, the second roller 33, the third roller 35 and the fourth roller 37 move between the position slightly separated from one end of the molded material holding body 29 (refer to FIG. 8) and the position slightly separated from the other end of the molded material holding body 29 (refer to FIG. 10), in the longitudinal direction of the molded material holding body 29.

The second roller 33 and the fourth roller 37 each include a small diameter portion 41 to avoid contact with the transfer pattern formation body MB1 of the wound replica mold MB (refer to FIG. 5).

Figure 8:
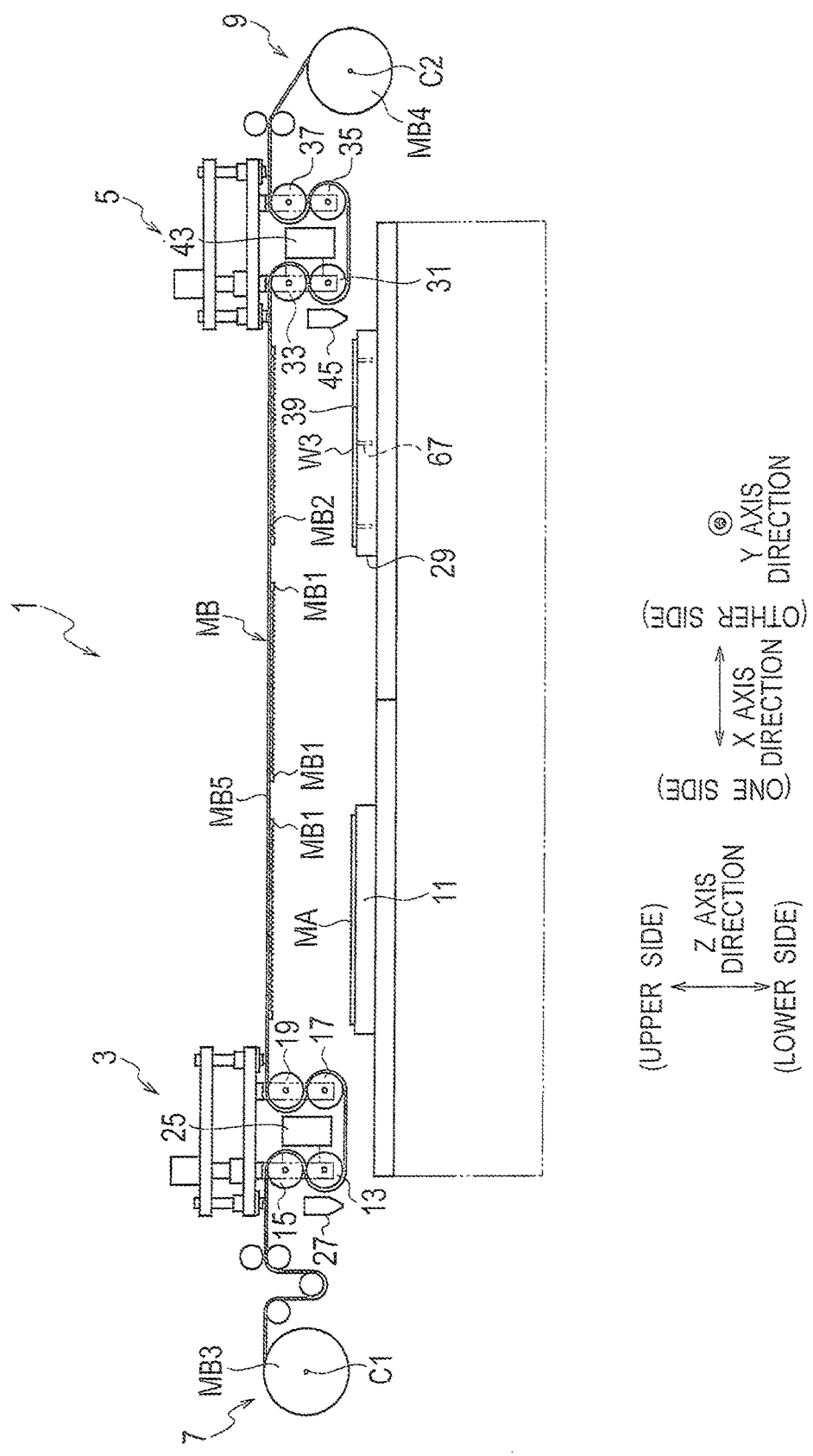
FIG. 8 shows the operation of the transfer device according to the embodiment of the present invention.
Figure 9:
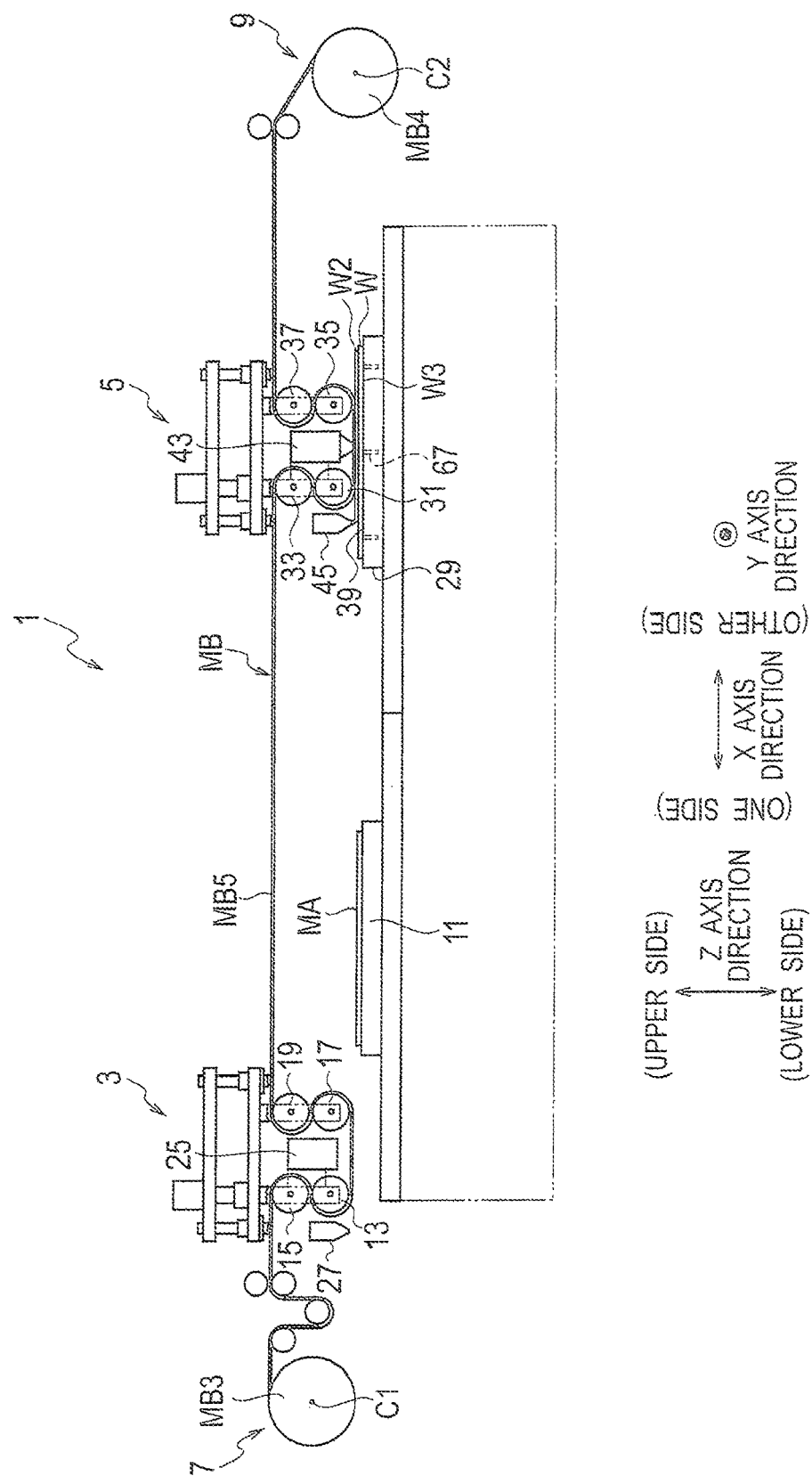
FIG. 9 shows the operation of the transfer device according to the embodiment of the present invention.

In the initial state shown in FIG. 8, (i) the molded material W is placed on the molded material holding body 29, (ii) the replica mold MB is wound on the respective rollers 31, 33, 35 and 37, (iii) the first roller 31 and the third roller 35 are separated from the molded material mounting surface 39 approximately by the distance corresponding to the sum of the thickness of the molded material W and the thickness of the replica mold MB (by the distance required for the transfer) in the direction perpendicular to the molded material mounting surface 39 (in the Z axis direction), and (iv) the respective rollers 31, 33, 35 and 37 are located at the position slightly separated from one end of the molded material holding body 29 in the longitudinal direction. In the initial state, the replica mold MB extending from the top of the second roller 33 is located immediately above the molded material holding body 29. The replica mold MB extending from the first roller 31 towards the third roller 35 is separated from the molded material holding body 29.

When viewing the initial state in the direction perpendicular to the molded material mounting surface 39 (in the Z axis direction), the part of the replica mold MB extending towards the left from the top of the second roller 33 in FIG. 3 overlaps the molded material mounting surface 39, and the part of the replica mold MB extending from the bottom of the first roller 31 towards the third roller 35 (towards the right) is separated from the molded material mounting surface 39.

When the respective rollers 31, 33, 35 and 37 move to one side (towards the left) in the longitudinal direction (the X axis direction) of the molded material holding body 29 from the initial state, the replica mold MB and the molded material W held between the first roller 31 and the molded material holding body 29 (the linear part extending in the width direction of the molded material holding body 29) also move from the right to the left. Note that, at this point, the replica mold MB does not slip on the respective rollers 31, 33, 35 and 37, or on the molded material W. The first roller 31 and the third roller 35 interpose the replica mold MB therebetween to form a rolling pair with respect to the molded material W on the molded material holding body 29.

The molded material W includes a substrate (a molded material substrate) W3 and the molded product W2.

The molded material substrate W3 is formed into, for example, a rectangular plate-like (sheet-like) shape made of a resin material such as PET resin. The molded product W2 is a thin film made of resin such as ultraviolet curable resin, thermoset resin or thermoplastic resin.

The molded material substrate W3 has substantially the same width as the mold substrate MB5. The molded material substrate W3 is slightly longer than each molded product (transfer pattern formation material) MB1 intermittently provided on the sheet-like mold substrate MB5.

The molded product W2 is formed into a rectangular thin film. The molded product W2 is provided on one surface in the thickness direction of the molded material substrate W3 in a state where the thickness direction (the Z axis direction) of the molded product W2 corresponds to that of the molded material substrate W3. The width direction (the Y axis direction) of the molded product W2 corresponds to that of the molded material substrate W3. The longitudinal direction of the molded product W2 corresponds to that (the X axis direction) of the molded material substrate W3. The molded product W2 has substantially the same width as the molded material substrate W3. The molded product W2 has substantially the same length as each molded product (transfer pattern formation material) MB1 intermittently provided on the mold substrate MB5 of the replica mold MB.

The fine transfer pattern W1 is formed on the surface of the molded product W2 (one surface in the thickness direction of the molded product W2, the one surface being the surface not in contact with the molded material substrate W3).

The molded material holding body 29 is formed into, for example, a rectangular plate-like shape. As described above, the molded material holding body 29 has the flat surface (one surface in the thickness direction; the upper surface; the mounting surface) 39 to hold the molded material W. The rear surface of the molded material W entirely comes into contact with the molded material mounting surface 39 of the molded material holding body 29, and is held by the molded material holding body 29 by means of for example, vacuum suction. Note that the rear surface represents one surface in the thickness direction of the molded material substrate W3, and represents that which is not the surface on which the molded product W2 is provided.

The width direction and the longitudinal direction of the molded material W mounted on the molded material holding body 29, correspond to the width direction (the Y axis direction) and the longitudinal direction (the X axis direction) of the molded material holding body 29, respectively.

In the case where the molded product W2 is ultraviolet curable resin, the transfer device 1 is provided with an ultraviolet ray generation unit 43 to cure the molded product W2. The ultraviolet ray generation unit 43 is moved and positioned together with the respective rollers 31, 33, 35 and 37. The ultraviolet ray generation unit 43 irradiates the area where the molded material W and the replica mold MB are held between the first roller 31 and the molded material holding body 29 (between the first roller 31 and the third roller 35), with ultraviolet rays to cure the molded product W2 of the molded material W. As a result, the fine transfer pattern W1 is formed on the molded material W.

Namely, when the respective rollers 31, 33, 35 and 37 are moving in the X axis direction, the ultraviolet ray generation unit 43 performs the irradiation at the rear side of the rollers 31 and 33. The molded product W2 is irradiated with the ultraviolet rays through the replica mold MB. Due to the irradiation with the ultraviolet rays, the molded product W2 is cured. In FIG. 8, the molded product W2 is cured sequentially from the right to the left.

When the respective rollers 31, 33, 35 and 37 are moving in the X axis direction, the third roller 35 and the fourth roller 37 wind up the replica mold MB, and remove (separate) the replica mold MB adhered to the molded material W on the molded material holding body 29 from the molded product W2 of the molded material W. The separated replica mold MB may be reused for the transfer in the second transfer unit 5.

The second transfer unit 5 is provided with a nozzle 45 for providing the uncured molded product W2 in a film state on the upper surface of the molded material substrate W3. The nozzle 45 is provided upstream of the rollers 31 and 33 (on the opposite side from the rollers 35 and 37 with the rollers 31 and 33 interposed therebetween). The nozzle 45 is moved and positioned in association with the respective rollers 31, 33, 35 and 37.

Alternatively, the nozzle 45 may be provided in the position indicated by reference numeral 45a in FIG. 3 so as to provide the uncured molded product W2 on the lower surface of the replica mold MB. The nozzle 45 may also be provided in the position indicated by reference numeral 45b in FIG. 3.

The transfer device 1 is explained in more detail below.

The transfer device 1 includes a base body 47. The first transfer unit 3 is provided with a vibration isolator 49. The vibration isolator 49 is provided on and integrated with the base body 47. The master mold holding body 11 of the first transfer unit 3 is provided on and integrated with the upper surface of the vibration isolator 49.

Pillars 51, a lower pillar support body (not shown in the figures), and an upper pillar support body 53 are provided above the vibration isolator 49. The pillars 51, the lower pillar support body and the upper pillar support body 53 are integrated together, and supported by the vibration isolator 49 via a linear guide bearing (not shown in the figures) in a manner as to be movable in the X axis direction on the vibration isolator 49.

The lower pillar support body (the pillars 51, the upper pillar support body 53) is moved and positioned in the X axis direction on the vibration isolator 49 (the master mold holding body 11) by an actuator (not shown in the figures) such as a servomotor or a ball screw (not shown in the figures) controlled by a controller.

A movable body 57 is supported by the pillars 51 via linear guide bearings 55. The movable body 57 is moved along the pillars 51 in the Z axis direction. The movable body 57 is moved and positioned in the Z axis direction along the pillars 51 (on the vibration isolator 49, the master mold holding body 11) by an actuator such as a servomotor 59 and a ball screw 61 controlled by the controller.

The movable body 57 is provided and integrated with roller support bodies 63. The roller support bodies 63 rotatably support the respective rollers 13, 15, 17 and 19. The respective rollers 13, 15, 17 and 19 are thus movable to be placed in any position in the X axis direction and the Z axis direction on the master mold holding body 11.

The respective rollers 13, 15, 17 and 19 rotate by way of an actuator (not shown in the figures) such as a servomotor. Alternatively, the respective rollers 13, 15, 17 and 19 may be rotatably supported by the roller support bodies 63. In such a case, the respective rollers 13, 15, 17 and 19 are not necessarily supplied with drive force for the rotation.

The roller support bodies 63 are provided and integrated with the ultraviolet ray generation unit 25 and the nozzle 27.

The transfer device 1 may move and position the master mold holding body 11 on the vibration isolator 49, instead of moving and positioning the lower pillar support body (the pillars 51, the upper pillar support body 53). Alternatively, the transfer device 1 may move and position the master mold holding body 11 on the vibration isolator 49, in addition to moving and positioning the lower pillar support body (the pillars 51, the upper pillar support body 53).

The second transfer unit 5 is provided with a vibration isolator 65. The vibration isolator 65 is provided on and integrated with the base body 47. Here, the vibration isolator 65 may be integrated with the vibration isolator 49. The molded material holding body 29 of the second transfer unit 5 is provided on and integrated with the upper surface of the vibration isolator 65.

The molded material holding body 29 is provided with lift pins 67. The lift pins 67 are moved in the Z axis direction by an actuator (not shown in the figures) such as a pneumatic cylinder. The actuator is controlled by a controller (not shown in the figures) including a CPU.

The lift pins 67 are moved downward in a manner as to be placed under the surface of the molded material holding body 29, and the lift pins 67 are moved upward in a manner as to protrude upward from the molded material mounting surface 39 of the molded material holding body 29.

Pillars 69, a lower pillar support body (not shown in the figures), and an upper pillar support body 71 are located above the vibration isolator 65. The pillars 69, the lower pillar support body and the upper pillar support body 71 are integrated together, and supported by the vibration isolator 65 via a linear guide bearing (not shown in the figures) in a manner as to be movable in the X axis direction on the vibration isolator 65.

The lower pillar support body (the pillars 69, the upper pillar support body 71) is moved and positioned in the X axis direction on the vibration isolator 65 (the molded material holding body 29) by an actuator (not shown in the figures) such as a servomotor or a ball screw (not shown in the figures) controlled by a controller (not shown in the figures).

A movable body 75 is supported by the pillars 69 via linear guide bearings 73. The movable body 75 is moved along the pillars 69 in the Z axis direction. The movable body 75 is moved and positioned in the Z axis direction along the pillars 69 (on the vibration isolator 65, the molded material holding body 29) by an actuator such as a servomotor 77 and a ball screw 79 controlled by the controller.

The movable body 75 is provided and integrated with roller support bodies 81. The roller support bodies 81 rotatably support the respective rollers 31, 33, 35 and 37. The respective rollers 31, 33, 35 and 37 are thus movable to be placed in any position in the X axis direction and the Z axis direction on the molded material holding body 29.

The respective rollers 31, 33, 35 and 37 rotate by way of an actuator (not shown in the figures) such as a servomotor. Alternatively, the respective rollers 31, 33, and 37 may be rotatably supported by the roller support bodies 81. In such a case, the respective rollers 31, 33, 35 and 37 are not necessarily supplied with drive force for the rotation.

The roller support bodies 81 are provided and integrated with the ultraviolet ray generation unit 43 and the nozzle 45.

The transfer device 1 may move and position the molded material holding body 29 on the vibration isolator 65, instead of moving and positioning the lower pillar support body (the pillars 69, the upper pillar support body 71). Alternatively, the transfer device 1 may move and position the molded material holding body 29 on the vibration isolator 65, in addition to moving and positioning the lower pillar support body (the pillars 69, the upper pillar support body 71).

The master replica mold placement unit 7 and the replica mold winding unit 9 are provided in the base body 47 (or may be provided in the vibration isolators 49 and 65).

Guide rollers 83A to 83D are provided between the master replica mold placement unit 7 and the first transfer unit 3. The replica mold MB is wound on the respective guide rollers 83A to 83D. The guide rollers 83A to 83D are provided in the base body 47. Alternatively, the guide rollers 83A to 83D may be provided in the vibration isolator 49.

The guide roller 83B is a dancer roller to be moved and positioned in the Z axis direction. The guide rollers 83C and 83D are positioned in a manner such that the replica mold MB extends horizontally between the guide rollers 83C and 83D and the second roller 15. For example, the guide rollers 83C and 83D are movable to be placed in any position in the Z axis direction depending on the movement and positioning of the second roller 15 in the Z axis direction.

Guide rollers 85 are provided between the second transfer unit 5 and the replica mold winding unit 9. The guide rollers 85 are configured to be movable to be placed in any position in the Z axis direction. The guide rollers 85 are positioned in a manner such that the replica mold MB extends horizontally between the fourth roller 37 and the guide rollers 85. The guide rollers 85 are provided in the base body 47 or the vibration isolator 65.

The operation of the transfer device 1 is explained below.

In the initial state shown in FIG. 6, the replica mold MB is elongated in a plate-like state and stopped between the master replica mold placement unit 7 and the replica mold winding unit 9.

In the first transfer unit 3, the master mold MA is held by the master mold holding body 11. The respective rollers 13, 15, 17 and 19 are separated from the master mold holding body 11 in the Z axis direction, and located towards the second transfer unit 5. The respective rollers 13, 15, 17 and 19 are positioned in the Z axis direction for the transfer. The ultraviolet ray generation unit 25 is on standby for irradiation.

In the second transfer unit 5, the molded material W is not placed on the molded material holding body 29. The lift pins 67 are located below the molded material holding body 29. The respective rollers 31, 33, 35 and 37 are separated from the molded material holding body 29 in the X axis direction, and located towards the replica mold winding unit 9. The respective rollers 31, 33, 35 and 37 are positioned in the Z axis direction for the transfer. The ultraviolet ray generation unit 43 is on standby for irradiation.

In the initial state, the nozzle 27 ejects the uncured ultraviolet curable resin (the molded product) MB1 on the master mold MA. The molded product MB1 spreads in a film state over the master mold MA. The respective rollers 13, 15, 17 and 19 move towards the master replica mold placement unit 7 together with the nozzle 27 and the ultraviolet ray generation unit 25. The ultraviolet ray generation unit 25 irradiates the molded product MB1 with ultraviolet rays to cure it. The first transfer unit 3 moves so that the replica mold MB is removed from the master mold MA (refer to FIG. 7).

The respective rollers 13, 15, 17 and 19 keep moving to be separated from the master mold holding body 11 (refer to FIG. 8).

Accordingly, the transfer pattern MA1 is transferred to the replica mold MB through the above-described process (first transfer process).

Then, the lift pins 67 are moved upward. A robot (not shown in the figures) places the molded material substrate W3 on the lift pins 67. Subsequently, the lift pins 67 are moved downward so that the molded material substrate W3 is positioned on the molded material holding body 29.

Then, the nozzle 45 ejects the uncured ultraviolet curable resin (the molded product) W2 on the molded material substrate W3. The molded product W2 spreads in a film state over the molded material substrate W3. The respective rollers 31, 33, 35 and 37 move towards the master replica mold placement unit 7 together with the nozzle 45 and the ultraviolet ray generation unit 43. The ultraviolet ray generation unit 43 irradiates the molded product W2 with ultraviolet rays to cure it. The second transfer unit 5 further moves so that the replica mold MB is removed from the molded material W (refer to FIG. 9).

Figure 10:
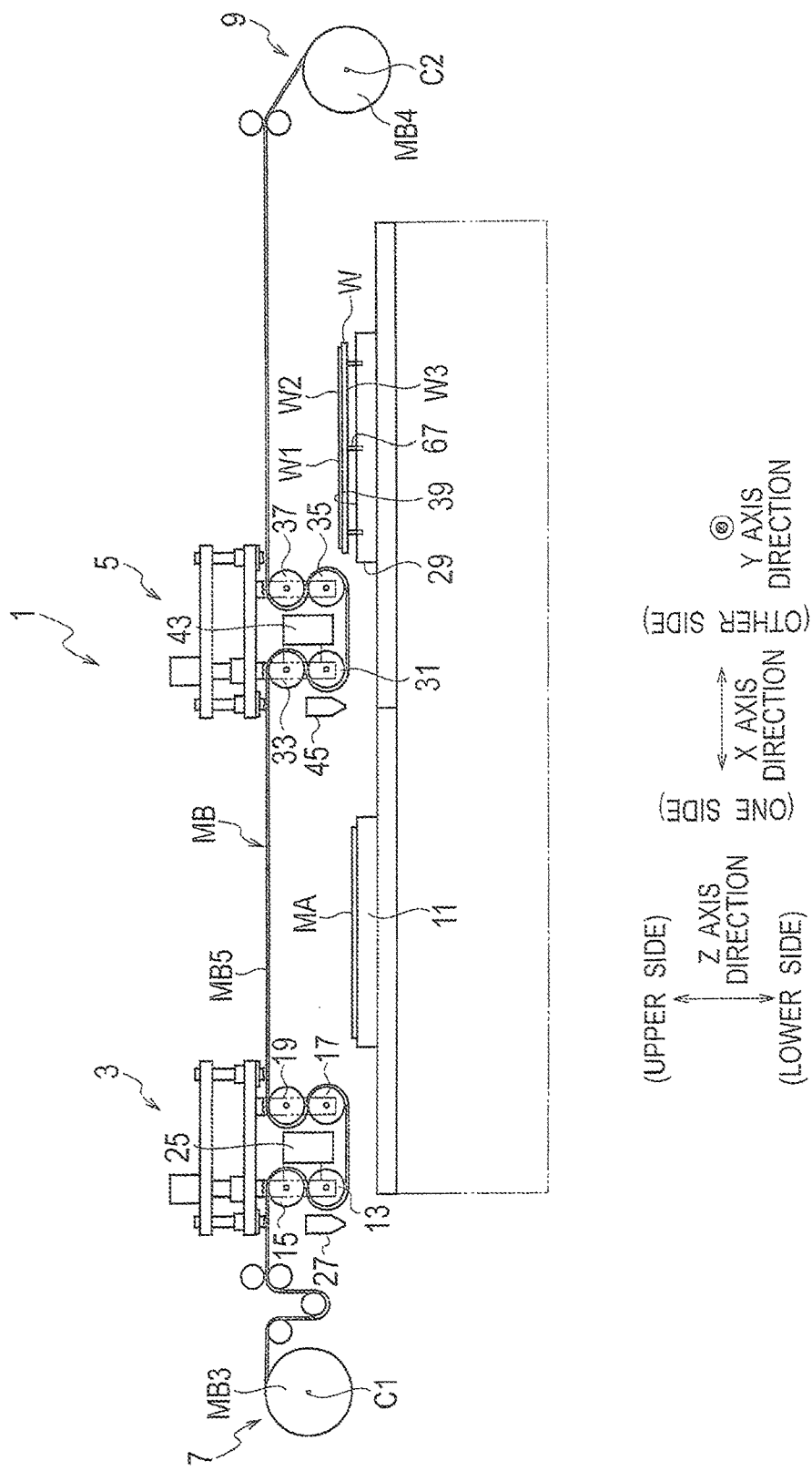
FIG. 10 shows the operation of the transfer device according to the embodiment of the present invention.

The respective rollers 31, 33, 35 and 37 keep moving to be separated from the molded material holding body 29 (refer to FIG. 10).

Accordingly, the transfer pattern MB2 formed in the first transfer process is transferred to the molded material W through the above-described process (second transfer process).

Then, the lift pins 67 are moved upward. A robot (not shown in the figures) conveys the molded material W to which the transfer pattern W1 is transferred. Subsequently, the lift pins 67 are moved downward.

Thereafter, the respective rollers 13, 15, 17, 19, 31, 33, 35 and 37 move towards the replica mold winding unit 9 so that the transfer device 1 returns to the initial state.

In the above explanation, the second transfer unit 5 starts operating after the first transfer unit 3 finishes its operation. The operation of the first transfer unit 3 and the operation of the second transfer unit 5 are concurrently performed. That is, the first transfer unit 3 performs the next transfer while the second transfer unit 5 is performing the transfer to the molded material W.

According to the transfer device 1 of the present embodiment, when the fine transfer pattern MB2 is transferred to the molded material W, the molded product (the uncured ultraviolet curable resin) W2 of the molded material W is irradiated with ultraviolet rays through the replica mold MB so as to be cured. The replica mold MB is made from a material that transmits light. Thus, the molded material W can be made from a material that does not transmit light, which contributes to increasing the choice of configurations of the molded material W.

Further, when the transfer pattern MA1 is transferred to the replica mold MB, the transfer pattern formation material (the uncured ultraviolet curable resin) MB1 is irradiated with ultraviolet rays through the replica mold MB so as to be cured. As described above, the replica mold MB is made from a material that transmits light. Thus, the master mold MA can be made from a material that does not transmit light, which contributes to increasing the choice of configurations of the master mold MA.

The replica mold MB has flexibility. Therefore, the replica mold MB can be rolled up to be separated from the molded material W even after the transfer of the fine transfer pattern MB2 to the molded material W with the replica mold MB adhered to the molded material W. Accordingly, there is no necessity to deform the molded material W at the point of separating the replica mold MB from the molded material W, which prevents, for example, damage of the molded material W.

The transfer device 1 according to the present embodiment includes the master replica mold placement unit 7 and the replica mold winding unit 9. Thus, the replacement of the replica mold MB can be easily and accurately made.

The replica mold MB is poor in durability. Thus, in the conventional case, the replica mold MB is required to be replaced every time or after a few cycles of transfer.

In contrast, the transfer device 1 according to the present embodiment includes the master replica mold placement unit 7 and the replica mold winding unit 9. Therefore, the transfer device 1 is only required to wind up a predetermined length of the replica mold MB by the replica mold winding unit 9, and pull out a new part of the replica mold MB (having not yet been used for transfer) from the master replica mold placement unit 7. This eliminates the process of detaching the replica mold MB from the transfer units 3 and 5 each time and replacing with a new one, and also contributes to easy and accurate replacement of the replica mold MB.

Since the replica mold MB can be replaced smoothly and rapidly, the replacement time of the replica mold MB, which is required in the conventional case, can be used for the transfer to the molded material W. This contributes to an increase in efficiency of the transfer.

The first transfer unit 3 includes the first to fourth rollers 13 to 19. The transfer is performed with the first roller 13 only by the one-way movement of the respective rollers 13, 15, 17 and 19 in the X axis direction. In addition, the third roller 17 immediately separates the replica mold MB from the master mold MA. Therefore, the transfer of the transfer pattern MA1 to the replica mold MB can be effectively carried out.

The second transfer unit 5 includes the first to fourth rollers 31 to 37. The transfer is performed with the first roller 31 only by the one-way movement of the respective rollers 31, 33, 35 and 37 in the X axis direction. In addition, the third roller 35 immediately separates the replica mold MB from the molded material W. Therefore, the transfer of the transfer pattern MB2 to the molded material W can be effectively carried out.

The fourth roller 19 and the second roller 33 have the small diameter parts 23 and 41, respectively, to avoid contact with the transfer pattern MB2 of the wound replica mold MB. This prevents the transfer pattern MB2 from being flattened by a tension of the replica mold MB.

The first roller 13 (31) and the second roller 15 (33) interpose the replica mold MB therebetween. Therefore, the second roller 15 (33) can serve as a backup roller for the first roller 13 (31). This minimizes deformation of the first roller 13 (31) at the point of transfer caused by a reaction force mainly applied from the molded material W.

The replica mold MB is wound on the respective rollers 13, 15, 17 and 19, and extends therefrom in parallel to the master mold mounting surface 21. The replica mold MB is further wound on the respective rollers 31, 33, 35 and 37, and extends therefrom in parallel to the molded material mounting surface 39. This eliminates the process of adjusting the length of the replica mold MB extending from the master replica mold placement unit 7 to the replica mold winding unit 9. As a result, the configuration of the transfer device 1 can be simplified.

Figure 11:
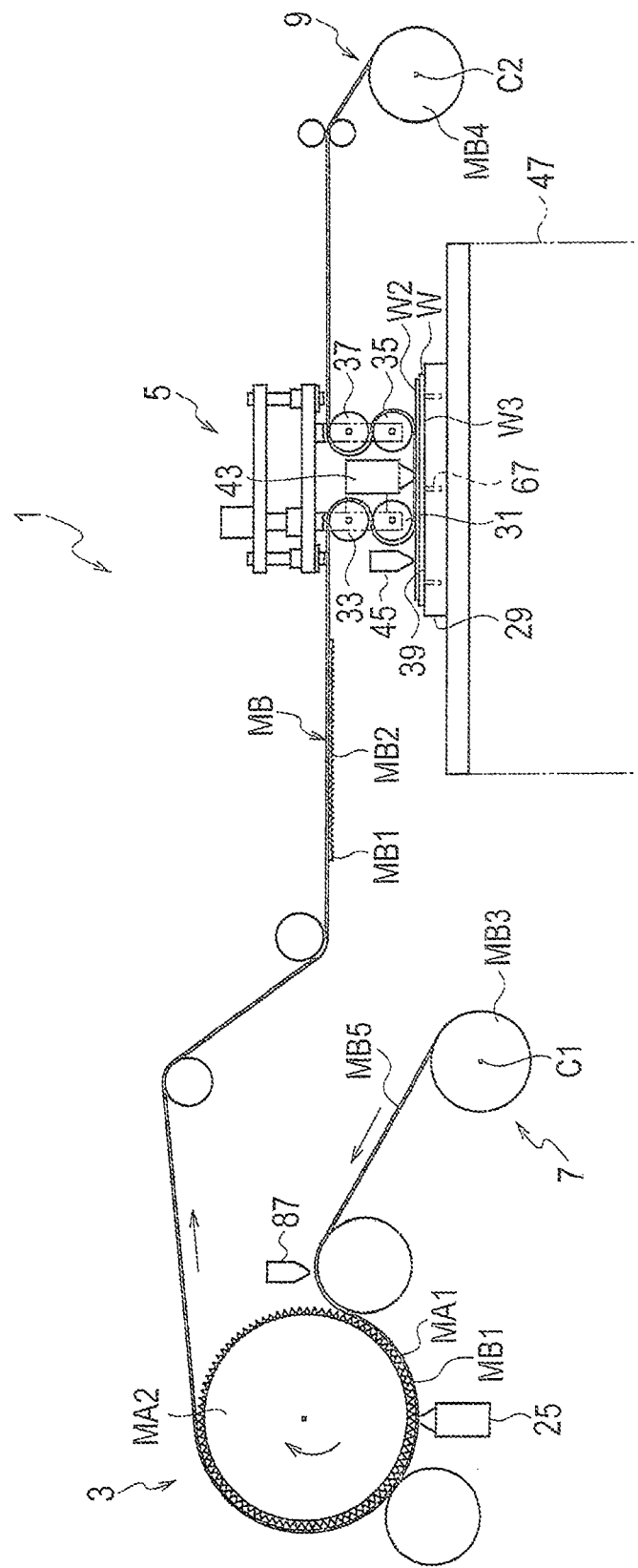
FIG. 11 shows a schematic configuration of a transfer device according to a modified example.

As shown in FIG. 11, the first transfer unit 3 may include a cylindrical master mold MA2 provided with the fine transfer pattern MA1 on the outer surface thereof. In such a case, the transfer to the replica mold MB may be performed in a manner such that the replica mold MB is wound on the master mold MA.

Reference numeral 87 shown in FIG. 11 is a nozzle for supplying the molded product MB1 of the replica mold MB.

The fine transfer pattern MA1 may be integrally formed on the master mold MA2. Alternatively, the fine transfer pattern MA1 may be provided on a thin sheet, and the thin sheet may be wound on and integrated with the main body of the master mold MA2.

What is claimed is:

1. A transfer device that transfers a transfer pattern formed on a master mold to a molded material, the transfer device comprising:
   a first transfer unit that transfers the transfer pattern formed on the master mold to a replica mold made from a material that transmits light; and
   a second transfer unit that transfers the transfer pattern formed on the replica mold by the first transfer unit to the molded material, the second transfer unit comprising a molded material holding body that holds the molded material, a first transfer roller, and a first removal roller;

wherein:
the replica mold is wound on the first transfer roller,
the first transfer roller holds, together with the molded material holding body, the wound replica mold and the molded material held by the molded material holding body,
the first transfer roller rotates about a central axis of the first transfer roller to move with respect to the molded material holding body to move the replica mold and the molded material to carry out a transfer,
the first removal roller is located further from the first transfer unit than the first transfer roller, and
the first removal roller is configured to separate the replica mold from the molded material by rotating about the central axis of the first removal roller to move with respect to the molded material holding body together with the first transfer roller to wind up the replica mold around the first removal roller and thereby separate the replica mold from the molded material.

2. The transfer device according to claim 1, further comprising a master replica mold placement unit and a replica mold winding unit,
wherein the replica mold extends and is stretched out by a predetermined tension between a master replica mold placed on the master replica mold placement unit and the replica mold winding unit.

3. The transfer device according to claim 1, wherein:
the first transfer unit comprises a master mold holding body that holds the master mold, a second transfer roller, and a second removal roller,
the replica mold is wound on the second transfer roller,
the second transfer roller holds, together with the master mold holding body, the replica mold wound on the second transfer roller and the master mold held by the master mold holding body, the second transfer roller rotating about a central axis of the second transfer roller to move with respect to the master mold holding body to move the master mold and the replica mold held to carry out the transfer,
the second removal roller is located closer to the second transfer unit than the second transfer roller, and
the second removal roller is configured to separate the replica mold from the master mold by rotating about the central axis of the second removal roller to move with respect to the master mold holding body together with the second transfer roller to wind up the replica mold and thereby separate the replica mold from the master mold.

4. The transfer device according to claim 1,
wherein the first transfer unit includes a cylindrical master mold, and
the replica mold is wound on the master mold to carry out a transfer.

5. The transfer device according to claim 1, further comprising
a first ray generation unit provided between the first transfer roller and the first removal roller in the second transfer unit, the first ray generation unit configured to irradiate a ray toward the molded material holding body, wherein
the first ray generation unit moves with respect to the molded material holding body with the first transfer roller and the first removal roller.

6. The transfer device according to claim 3, further comprising
a second ray generation unit provided between the second transfer roller and the second removal roller in the first transfer unit, the second ray generation unit configured to irradiate a ray toward the master mold holding body, wherein
the second ray generation unit moves with respect to the master mold holding body with the second transfer roller and the second removal roller.

* * * * *